(12) United States Patent
Sun et al.

(10) Patent No.: US 9,013,818 B1
(45) Date of Patent: Apr. 21, 2015

(54) DISK DRIVE MEASURING READER/WRITER GAP BY MEASURING FRACTIONAL CLOCK CYCLE OVER DISK RADIUS

(71) Applicant: Western Digital Technologies, Inc., Irvine, CA (US)

(72) Inventors: Zhenyu Sun, Irvine, CA (US); Teik Ee Yeo, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/137,314

(22) Filed: Dec. 20, 2013

Related U.S. Application Data

(60) Provisional application No. 61/913,168, filed on Dec. 6, 2013.

(51) Int. Cl.
| | | |
|---|---|---|
| *G11B 5/09* | (2006.01) | |
| *G11B 5/58* | (2006.01) | |
| *G11B 5/596* | (2006.01) | |

(52) U.S. Cl.
CPC .............. *G11B 5/58* (2013.01); *G11B 5/59616* (2013.01); *G11B 5/59627* (2013.01)

(58) Field of Classification Search
USPC ..................................... 360/50, 51, 75, 77.08
See application file for complete search history.

(56) References Cited

U.S. PATENT DOCUMENTS

| | | |
|---|---|---|
| 5,751,512 A | 5/1998 | Anderson |
| 5,991,115 A | 11/1999 | Chainer et al. |
| 5,998,994 A | 12/1999 | Mori |
| 6,018,789 A | 1/2000 | Sokolov et al. |
| 6,061,201 A | 5/2000 | Woods |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,181,500 B1 | 1/2001 | Serrano et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,252,732 B1 | 6/2001 | Chainer et al. |
| 6,256,695 B1 | 7/2001 | Williams |

(Continued)

*Primary Examiner* — Dismery Mercedes

(57) ABSTRACT

A disk drive is disclosed comprising a disk, and a head actuated radially over the disk, wherein the head comprises a read element separated from a write element by a reader/writer gap. A disk-locked clock is synchronized to a rotation of the disk, wherein the disk-locked clock comprises a plurality of clock cycles, and the reader/writer gap spans a first number of the clock cycles comprising an integer of the clock cycles plus a fraction of one of the clock cycles. The fraction of one of the clock cycles is measured when the head is positioned at a first plurality of radial locations across the disk, and a second plurality of radial locations is estimated where the fraction substantially equals a full one of the clock cycles.

10 Claims, 4 Drawing Sheets

(56) References Cited

U.S. PATENT DOCUMENTS

| | | |
|---|---|---|
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,285 B1 | 11/2001 | Bi et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,476,992 B1 | 11/2002 | Shimatani |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,510,017 B1 | 1/2003 | Abdelnour |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,633,451 B1 | 10/2003 | Chainer et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,553 B2 * | 4/2004 | Yun et al. ........... 360/51 |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,738,205 B1 * | 5/2004 | Moran et al. ........... 360/17 |
| 6,744,772 B1 | 6/2004 | Eneboe et al. |
| 6,745,283 B1 | 6/2004 | Dang |
| 6,751,402 B1 | 6/2004 | Elliott et al. |
| 6,754,030 B2 * | 6/2004 | Seng et al. ........... 360/76 |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,947,248 B2 | 9/2005 | Allen et al. |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 * | 2/2006 | Sargenti et al. ........... 360/51 |
| 7,009,820 B1 | 3/2006 | Hogg |

(56) References Cited

U.S. PATENT DOCUMENTS

| | | | |
|---|---|---|---|
| 7,023,639 | B1 | 4/2006 | Kupferman |
| 7,024,491 | B1 | 4/2006 | Hanmann et al. |
| 7,024,549 | B1 | 4/2006 | Luu et al. |
| 7,024,614 | B1 | 4/2006 | Thelin et al. |
| 7,027,716 | B1 | 4/2006 | Boyle et al. |
| 7,028,174 | B1 | 4/2006 | Atai-Azimi et al. |
| 7,031,902 | B1 | 4/2006 | Catiller |
| 7,046,465 | B1 | 5/2006 | Kupferman |
| 7,046,488 | B1 | 5/2006 | Hogg |
| 7,050,252 | B1 | 5/2006 | Vallis |
| 7,054,937 | B1 | 5/2006 | Milne et al. |
| 7,055,000 | B1 | 5/2006 | Severtson |
| 7,055,167 | B1 | 5/2006 | Masters |
| 7,057,836 | B1 | 6/2006 | Kupferman |
| 7,062,398 | B1 | 6/2006 | Rothberg |
| 7,075,746 | B1 | 7/2006 | Kupferman |
| 7,076,604 | B1 | 7/2006 | Thelin |
| 7,082,494 | B1 | 7/2006 | Thelin et al. |
| 7,088,538 | B1 | 8/2006 | Codilian et al. |
| 7,088,545 | B1 | 8/2006 | Singh et al. |
| 7,092,186 | B1 | 8/2006 | Hogg |
| 7,095,577 | B1 | 8/2006 | Codilian et al. |
| 7,099,095 | B1 | 8/2006 | Subrahmanyam et al. |
| 7,106,534 | B2 * | 9/2006 | Yoshida et al. .................. 360/51 |
| 7,106,537 | B1 | 9/2006 | Bennett |
| 7,106,947 | B2 | 9/2006 | Boyle et al. |
| 7,110,202 | B1 | 9/2006 | Vasquez |
| 7,111,116 | B1 | 9/2006 | Boyle et al. |
| 7,114,029 | B1 | 9/2006 | Thelin |
| 7,120,737 | B1 | 10/2006 | Thelin |
| 7,120,806 | B1 | 10/2006 | Codilian et al. |
| 7,126,776 | B1 | 10/2006 | Warren, Jr. et al. |
| 7,129,763 | B1 | 10/2006 | Bennett et al. |
| 7,133,600 | B1 | 11/2006 | Boyle |
| 7,136,244 | B1 | 11/2006 | Rothberg |
| 7,146,094 | B1 | 12/2006 | Boyle |
| 7,149,046 | B1 | 12/2006 | Coker et al. |
| 7,150,036 | B1 | 12/2006 | Milne et al. |
| 7,155,616 | B1 | 12/2006 | Hamlin |
| 7,171,108 | B1 | 1/2007 | Masters et al. |
| 7,171,110 | B1 | 1/2007 | Wilshire |
| 7,194,576 | B1 | 3/2007 | Boyle |
| 7,200,698 | B1 | 4/2007 | Rothberg |
| 7,205,805 | B1 | 4/2007 | Bennett |
| 7,206,497 | B1 | 4/2007 | Boyle et al. |
| 7,215,496 | B1 | 5/2007 | Kupferman et al. |
| 7,215,771 | B1 | 5/2007 | Hamlin |
| 7,237,054 | B1 | 6/2007 | Cain et al. |
| 7,240,161 | B1 | 7/2007 | Boyle |
| 7,249,365 | B1 | 7/2007 | Price et al. |
| 7,263,709 | B1 | 8/2007 | Krapf |
| 7,274,639 | B1 | 9/2007 | Codilian et al. |
| 7,274,659 | B2 | 9/2007 | Hospodor |
| 7,275,116 | B1 | 9/2007 | Hanmann et al. |
| 7,280,302 | B1 | 10/2007 | Masiewicz |
| 7,292,774 | B1 | 11/2007 | Masters et al. |
| 7,292,775 | B1 | 11/2007 | Boyle et al. |
| 7,296,284 | B1 | 11/2007 | Price et al. |
| 7,302,501 | B1 | 11/2007 | Cain et al. |
| 7,302,579 | B1 | 11/2007 | Cain et al. |
| 7,318,088 | B1 | 1/2008 | Mann |
| 7,319,806 | B1 | 1/2008 | Willner et al. |
| 7,325,244 | B2 | 1/2008 | Boyle et al. |
| 7,330,323 | B1 | 2/2008 | Singh et al. |
| 7,346,790 | B1 | 3/2008 | Klein |
| 7,366,641 | B1 | 4/2008 | Masiewicz et al. |
| 7,369,340 | B1 | 5/2008 | Dang et al. |
| 7,369,343 | B1 | 5/2008 | Yeo et al. |
| 7,372,650 | B1 | 5/2008 | Kupferman |
| 7,380,147 | B1 | 5/2008 | Sun |
| 7,392,340 | B1 | 6/2008 | Dang et al. |
| 7,400,464 | B1 | 7/2008 | Katchmart |
| 7,404,013 | B1 | 7/2008 | Masiewicz |
| 7,406,545 | B1 | 7/2008 | Rothberg et al. |
| 7,415,571 | B1 | 8/2008 | Hanan |
| 7,436,610 | B1 | 10/2008 | Thelin |
| 7,437,502 | B1 | 10/2008 | Coker |
| 7,440,214 | B1 | 10/2008 | Ell et al. |
| 7,451,344 | B1 | 11/2008 | Rothberg |
| 7,471,483 | B1 | 12/2008 | Ferris et al. |
| 7,471,486 | B1 | 12/2008 | Coker et al. |
| 7,486,060 | B1 | 2/2009 | Bennett |
| 7,496,493 | B1 | 2/2009 | Stevens |
| 7,518,819 | B1 | 4/2009 | Yu et al. |
| 7,526,184 | B1 | 4/2009 | Parkinen et al. |
| 7,539,924 | B1 | 5/2009 | Vasquez et al. |
| 7,543,117 | B1 | 6/2009 | Hanan |
| 7,551,383 | B1 | 6/2009 | Kupferman |
| 7,562,282 | B1 | 7/2009 | Rothberg |
| 7,577,973 | B1 | 8/2009 | Kapner, III et al. |
| 7,596,797 | B1 | 9/2009 | Kapner, III et al. |
| 7,599,139 | B1 | 10/2009 | Bombet et al. |
| 7,602,568 | B1 | 10/2009 | Katchmart |
| 7,619,841 | B1 | 11/2009 | Kupferman |
| 7,647,544 | B1 | 1/2010 | Masiewicz |
| 7,649,704 | B1 | 1/2010 | Bombet et al. |
| 7,653,927 | B1 | 1/2010 | Kapner, III et al. |
| 7,656,603 | B1 | 2/2010 | Xing |
| 7,656,763 | B1 | 2/2010 | Jin et al. |
| 7,657,149 | B2 | 2/2010 | Boyle |
| 7,672,072 | B1 | 3/2010 | Boyle et al. |
| 7,673,075 | B1 | 3/2010 | Masiewicz |
| 7,679,852 | B2 | 3/2010 | Shaver et al. |
| 7,688,540 | B1 | 3/2010 | Mei et al. |
| 7,724,461 | B1 | 5/2010 | McFadyen et al. |
| 7,725,584 | B1 | 5/2010 | Hanmann et al. |
| 7,730,295 | B1 | 6/2010 | Lee |
| 7,760,458 | B1 | 7/2010 | Trinh |
| 7,768,776 | B1 | 8/2010 | Szeremeta et al. |
| 7,773,328 | B1 | 8/2010 | Katchmart et al. |
| 7,804,657 | B1 | 9/2010 | Hogg et al. |
| 7,813,954 | B1 | 10/2010 | Price et al. |
| 7,827,320 | B1 | 11/2010 | Stevens |
| 7,839,588 | B1 | 11/2010 | Dang et al. |
| 7,843,660 | B1 * | 11/2010 | Yeo .................. 360/53 |
| 7,852,596 | B2 | 12/2010 | Boyle et al. |
| 7,859,782 | B1 | 12/2010 | Lee |
| 7,872,822 | B1 | 1/2011 | Rothberg |
| 7,898,756 | B1 | 3/2011 | Wang |
| 7,898,762 | B1 | 3/2011 | Guo et al. |
| 7,900,037 | B1 | 3/2011 | Fallone et al. |
| 7,907,364 | B2 | 3/2011 | Boyle et al. |
| 7,929,234 | B1 | 4/2011 | Boyle et al. |
| 7,933,087 | B1 | 4/2011 | Tsai et al. |
| 7,933,090 | B1 | 4/2011 | Jung et al. |
| 7,934,030 | B1 | 4/2011 | Sargenti, Jr. et al. |
| 7,940,491 | B2 | 5/2011 | Szeremeta et al. |
| 7,944,639 | B1 | 5/2011 | Wang |
| 7,945,727 | B2 | 5/2011 | Rothberg et al. |
| 7,974,029 | B2 | 7/2011 | Tsai et al. |
| 7,974,039 | B1 | 7/2011 | Xu et al. |
| 7,982,993 | B1 | 7/2011 | Tsai et al. |
| 7,984,200 | B1 | 7/2011 | Bombet et al. |
| 7,990,648 | B1 | 8/2011 | Wang |
| 7,992,179 | B1 | 8/2011 | Kapner, III et al. |
| 8,004,785 | B1 | 8/2011 | Tsai et al. |
| 8,006,027 | B1 | 8/2011 | Stevens et al. |
| 8,014,094 | B1 | 9/2011 | Jin |
| 8,014,977 | B1 | 9/2011 | Masiewicz et al. |
| 8,019,914 | B1 | 9/2011 | Vasquez et al. |
| 8,040,625 | B1 | 10/2011 | Boyle et al. |
| 8,078,943 | B1 | 12/2011 | Lee |
| 8,079,045 | B2 | 12/2011 | Krapf et al. |
| 8,082,433 | B1 | 12/2011 | Fallone et al. |
| 8,085,487 | B1 | 12/2011 | Jung et al. |
| 8,089,719 | B1 | 1/2012 | Dakroub |
| 8,090,902 | B1 | 1/2012 | Bennett et al. |
| 8,090,906 | B1 | 1/2012 | Blaha et al. |
| 8,091,112 | B1 | 1/2012 | Elliott et al. |
| 8,094,396 | B1 | 1/2012 | Zhang et al. |
| 8,094,401 | B1 | 1/2012 | Peng et al. |
| 8,116,020 | B1 | 2/2012 | Lee |
| 8,116,025 | B1 | 2/2012 | Chan et al. |
| 8,134,793 | B1 | 3/2012 | Vasquez et al. |

(56) References Cited

U.S. PATENT DOCUMENTS

| | | |
|---|---|---|
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,233,228 B2 * | 7/2012 | Grundvig et al. ............... 360/51 |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,506 B1 * | 11/2013 | Wang et al. ............... 360/50 |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 * | 6/2014 | Sun et al. ............... 360/75 |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2002/0101672 A1 | 8/2002 | Chainer et al. |
| 2002/0131191 A1 | 9/2002 | Osafune |
| 2003/0002190 A1 | 1/2003 | Teo et al. |
| 2003/0002197 A1 | 1/2003 | Seng et al. |
| 2004/0125491 A1 | 7/2004 | Iseri et al. |
| 2004/0190174 A1 | 9/2004 | Yoshida et al. |
| 2009/0113702 A1 | 5/2009 | Hogg |
| 2010/0118427 A1 * | 5/2010 | Buch et al. ............... 360/51 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

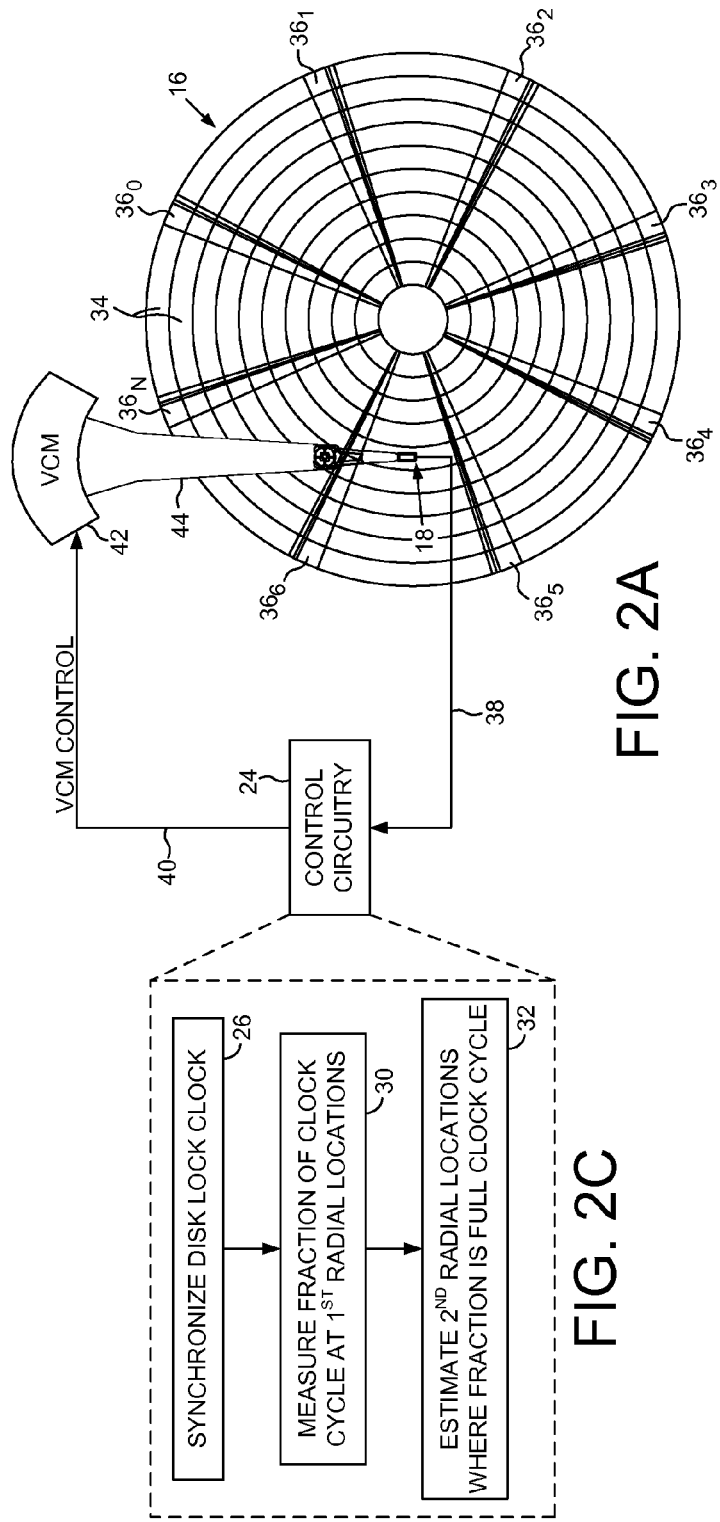
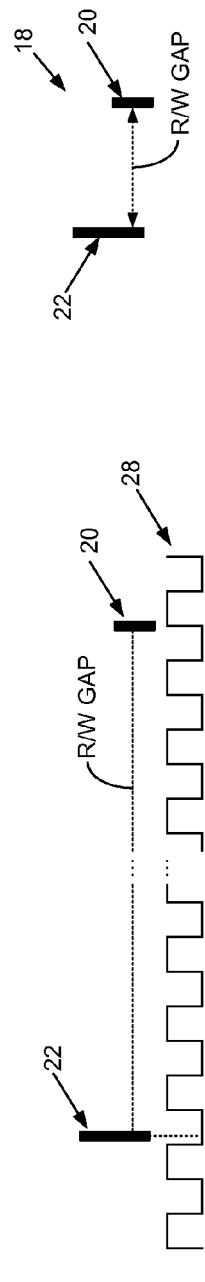

DISK DRIVE MEASURING READER/WRITER GAP BY MEASURING FRACTIONAL CLOCK CYCLE OVER DISK RADIUS

CROSS-REFERENCE TO RELATED APPLICATIONS

This application claims priority to provisional U.S. Patent Application Ser. No. 61/913,168, filed on Dec. 6, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a disk and head actuated radially over the disk.

FIG. 2B shows an embodiment of the head comprising a read element separated from a write element by a reader/writer gap.

FIG. 2C is a flow diagram according to an embodiment wherein a fraction of a disk-locked clock cycle is measured at a first plurality of radial locations in order to estimate a second number of radial locations wherein the fraction equals a full clock cycle.

FIG. 2D illustrates a fraction of a disk-locked clock cycle relative to the reader/writer gap according to an embodiment.

DETAILED DESCRIPTION

Figure 1:
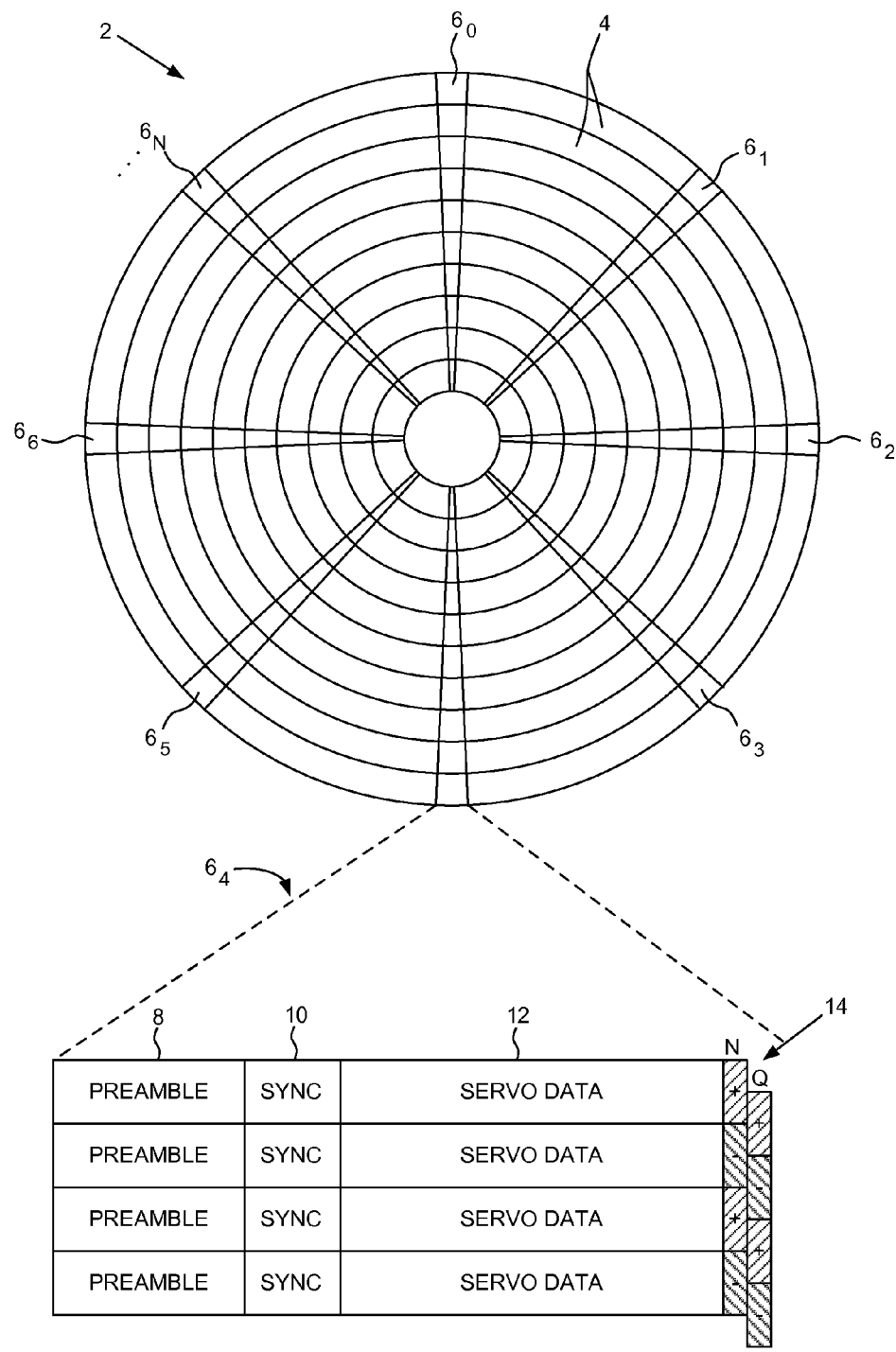
FIG. 1 shows a prior art disk format comprising a plurality of servo tracks defined by servo sectors.

FIG. 2A shows a disk drive according to an embodiment comprising a disk 16, and a head 18 actuated radially over the disk 16, wherein the head 18 comprises a read element 20 separated from a write element 22 by a reader/writer gap (FIG. 2B). The disk drive further comprises control circuitry 24 configured to execute the flow diagram of FIG. 2C, wherein a disk-locked clock 28 is synchronized to a rotation of the disk (block 26), the disk-locked clock 28 comprising a plurality of clock cycles, and the reader/writer gap spans a first number of the clock cycles comprising an integer of the clock cycles plus a fraction of one of the clock cycles (FIG. 2D). The fraction of one of the clock cycles is measured when the head is positioned at a first plurality of radial locations across the disk (block 30), and a second plurality of radial locations is estimated where the fraction substantially equals a full one of the clock cycles (block 32).

In the embodiment of FIG. 2A, a plurality of concentric servo tracks 34 are defined by embedded servo sectors $36_0$-$36_N$, wherein a plurality of concentric data tracks are defined relative to the servo tracks at the same or different radial density. The control circuitry 24 processes a read signal 38 emanating from the head 18 to demodulate the servo sectors and generate a position error signal (PES) representing an error between the actual position of the head and a target position relative to a target track. The control circuitry 24 filters the PES using a suitable compensation filter to generate a control signal 40 applied to a voice coil motor (VCM) 42 which rotates an actuator arm 44 about a pivot in order to actuate the head 18 radially over the disk 16 in a direction that reduces the PES. The servo sectors $36_0$-$36_N$ may comprise any suitable head position information, such as a track address for coarse positioning and servo bursts for fine positioning. The servo bursts may comprise any suitable pattern, such as an amplitude based servo pattern or a phase based servo pattern.

In an embodiment described below, extended servo data may be learned (e.g., compensation values that account for a repeatable disturbance) which may then be written after each servo sector as illustrated in the embodiment of FIG. 2A. During normal operation, the control circuitry 24 may read and process the extended servo data to facilitate servoing the head radially over the disk. In one embodiment, it may be desirable to write the extended servo data synchronous with each servo sector in order to obviate a preamble and sync mark in front of the extended servo data, thereby improving the format efficiency. In order to write the extended servo data synchronous with each servo sector, in one embodiment the reader/writer gap in terms of clock cycles of the disk-locked clock is measured and then used to write the extended servo data synchronous with each servo sector.

Figure 3A:
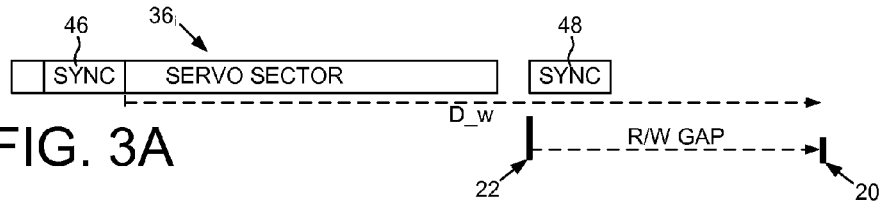
FIGS. 3A and 3B illustrate an embodiment for measuring an integer number of disk-locked clock cycles relative to the reader/writer gap.
Figure 3B:
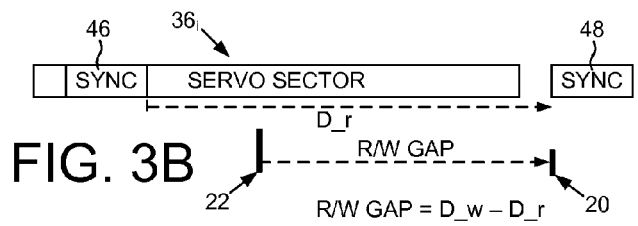

FIGS. 3A and 3B illustrate a technique for measuring the reader/writer gap when the reader/writer gap spans an integer number of the clock cycles 28. A reference clock cycle of the disk-locked clock is determined, such as when the read element 20 reaches the end of a first sync mark 46 in a servo sector 36$_i$. After delaying by a write delay (D_w) comprising an integer number of clock cycles as measured from the reference clock cycle, a second sync mark 48 is written during a first revolution of the disk. During a second revolution of the disk, a read delay (D_r) is measured from the reference clock cycle to the beginning of the second sync mark 48 (as determined after detecting the second sync mark 48). The reader/writer gap is then computed by subtracting the read delay (D_r) from the write delay (D_w).

Figure 4:
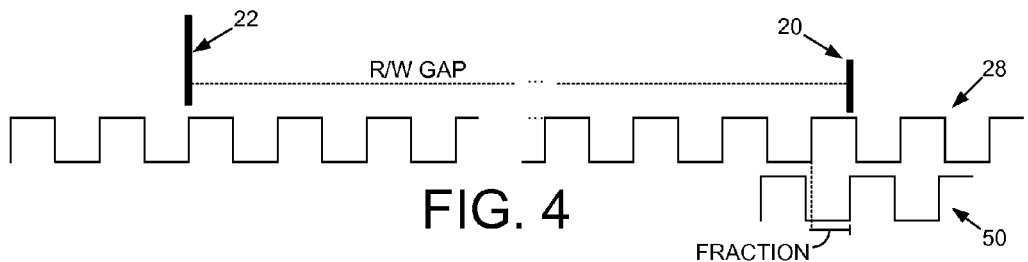
FIG. 4 illustrates an embodiment for measuring the fraction of the disk-locked clock cycle relative to the reader/writer gap.

Any suitable technique may be employed to measure the fraction of the clock cycle in the reader/writer gap measurement. FIG. 4 illustrates an embodiment wherein the fraction is measured by writing a second preamble at the end of a servo sector similar to writing the second sync mark 48 shown in FIG. 3A. During the second disk revolution, a first disk-locked clock 28 is synchronized to the first preamble of the servo sector, and a second disk-locked clock 50 is synchronized to the second preamble. The phase difference between the first disk-locked clock 28 and the second disk-locked clock 50 represents the fraction of the clock cycle in the reader/writer gap. In another embodiment, the second preamble may be sampled asynchronously with the first disk-locked clock 28 and with the timing recovery disabled. The phase offset between the first preamble and the second preamble may then be measured by computing a discrete Fourier transform (DFT) of the asynchronous signal samples of the second preamble relative to a DFT computed over the synchronous samples of the first preamble (or over synchronous samples of a servo burst).

Figure 5:
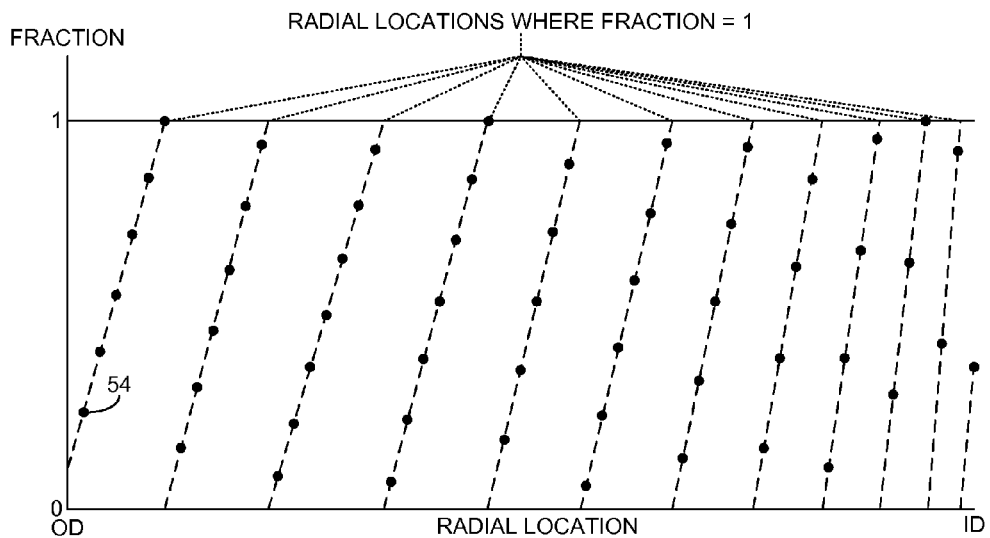
FIG. 5 shows an example embodiment where the second number of radial locations is estimated at the locations where the fraction equals a full clock cycle.

FIG. 5 illustrates an example where the fraction of the clock cycle is measured when the head is positioned at a first plurality of radial locations across the disk 16 represented by the black dots. In on embodiment, the reader/writer gap increases from the outer diameter of the disk toward the inner diameter of the disk due to the decrease in the circumference of the servo tracks. That is, since the physical distance of the reader/writer gap remains constant, the number of clock cycles spanned by the reader/writer gap will increase toward the inner diameter of the disk due to the decrease in the linear velocity of the servo tracks (and the corresponding increase in the linear bit density of the servo data). In the example of FIG. 5, the variation in the reader/writer gap spans multiple clock cycles from the outer diameter to the inner diameter of the disk. Accordingly, the fraction of the clock cycle will vary from zero to a full clock cycle several times as the head moves from the outer diameter toward the inner diameter as shown in FIG. 5. In one embodiment, the control circuitry 24 measures the fraction at a first plurality of radial locations which may be evenly spaced across the radius of the disk as shown in FIG. 5. The control circuitry 24 may then curve fit the fractions between zero and one to a suitable polynomial, which may be a plurality of simple linear equations as shown in FIG. 5. The curve fitted polynomials may then be used to estimate the second plurality of radial locations where the fraction substantially equals a full one of the disk-locked clock cycles as shown in FIG. 5.

Figure 6:
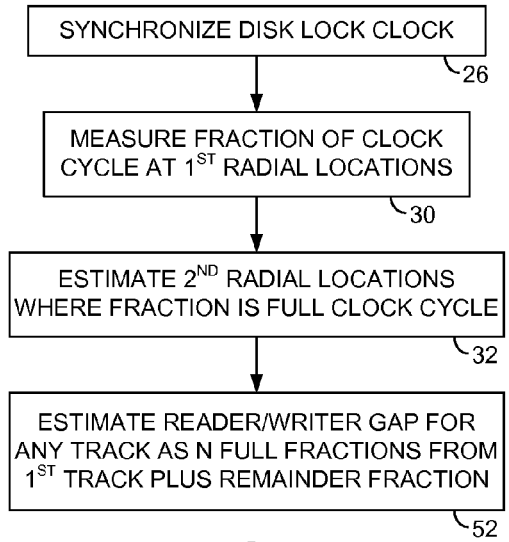
FIG. 6 is a flow diagram according to an embodiment wherein the reader/writer gap in disk-locked clock cycles is estimated for a target track relative to a reference track.
Figure 7:
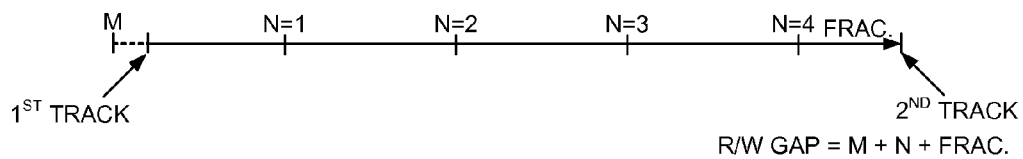
FIG. 7 illustrates an example for estimating the reader/writer gap in disk-locked clock cycles for a target track relative to a reference track.
Figure 8:
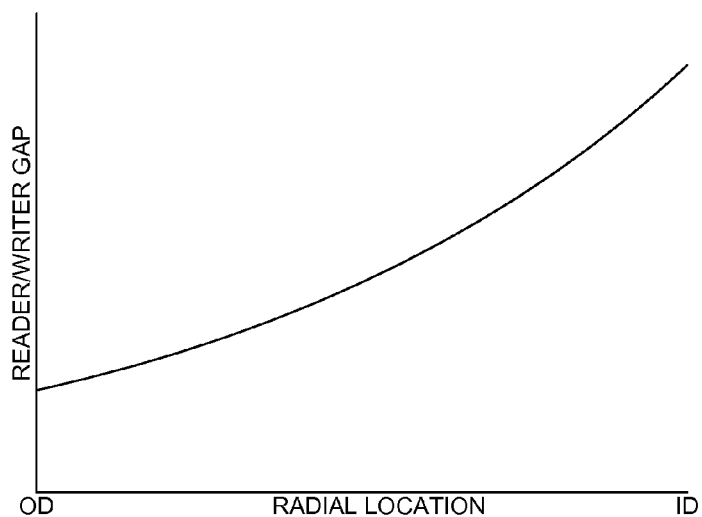
FIG. 8 shows the reader/writer gap estimates over the radius of the disk according to an embodiment.

The radial locations where the fraction substantially equals a full one of the disk-locked clock cycles may be used in any suitable manner. FIG. 6 is a flow diagram according to an embodiment which extends on the flow diagram of FIG. 2C, wherein the control circuitry 24 measures the reader/writer gap at any given radial location in units of disk-locked clock cycles based on the second plurality of radial locations where the fraction substantially equals a full one of the clock cycles (block 52). For example, in one embodiment the control circuitry 24 may measure the reader/writer gap in units of disk-locked clock cycles (integer plus fraction) at a first radial location, such as at the first radial location 54 shown in FIG. 5. The first integer M of clock cycles in the reader/writer gap at the first radial location 54 may be measured in any suitable manner, such as described above with reference to FIGS. 3A and 3B. The reader/writer gap in units of disk-locked clock cycles may then be estimated at a second radial location by adding an integer N to the integer M, where N represents a number of times the fraction substantially equals a full one of the clock cycles between the first radial location and the second radial location. An example of this embodiment is illustrated in FIG. 7 where the reader/writer gap is estimated at a second radial location by adding N=4 to M, where N increments by one each time the fraction wraps (i.e., each time the fraction equals a full disk-locked clock cycle). In one embodiment, the fraction of the disk-locked clock cycle at the second radial location may be estimated by using the curve fitted polynomial equation, such as the linear equation shown in FIG. 5 that corresponds to the second radial location. Accordingly, the fraction of the disk-locked clock cycle measured at the first radial locations across the radius of the disk as shown in the example of FIG. 5 may be used to estimate the reader/writer gap in units of the disk-locked clock (integer plus fraction) at any given radial location, and in one embodiment the reader/writer gap may be estimated across the entire radius of the disk as shown in the example of FIG. 8.

In one embodiment, the reader/writer gap in units of the disk-locked clock may be used to write extended servo data synchronous with the end of each servo sector, such as compensation values that account for a repeatable disturbance. For example, when the read element 22 passes over the end of a servo sector, the control circuitry may delay by the estimated reader/writer gap (integer plus fraction of disk-locked clock cycles) and then write the extended servo data just past the end of the servo sector. In this manner, when the servo sector is read again, the disk-locked clock used to sample the read signal generated by the read element 22 will be synchronized to the extended servo data, thereby enabling accurate recovery of the extended servo data while minimizing the recording area consumed by the extended servo data. That is, since the extended servo data is written synchronous with the end of the servo sector, there may be no need to record a preamble and sync mark at the beginning of the extended servo data. In addition, since the reader/writer gap has been estimated at each radial location, the extended servo data may be written very close to the end of each servo sector in order to minimize the gap between the servo sector and extended servo data.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
    a disk;
    a head actuated radially over the disk, wherein the head comprises a read element separated from a write element by a reader/writer gap; and
    control circuitry configured to:
        synchronize a disk-locked clock to a rotation of the disk, wherein:
            the disk-locked clock comprises a plurality of clock cycles; and
            the reader/writer gap spans a first number of the clock cycles comprising an integer of the clock cycles plus a fraction of one of the clock cycles;
        measure the fraction of one of the clock cycles when the head is positioned at a first plurality of radial locations across the disk; and
        estimate a second plurality of radial locations where the fraction substantially equals a full one of the clock cycles.

2. The disk drive as recited in claim 1, wherein the control circuitry is further configured to estimate the first number of the clock cycles for a third plurality of radial locations based on the second plurality of radial locations.

3. The disk drive as recited in claim 2, wherein the control circuitry is further configured to:
    measure a first integer M of clock cycles at a first radial location; and
    estimate a first number of clock cycles at a second radial location by adding N to the first integer M where N represents a number of times the fraction substantially equals a full one of the clock cycles between the first radial location and the second radial location.

4. The disk drive as recited in claim 3, wherein the control circuitry is further configured to estimate the fraction of one of the clock cycles at the second radial location based on the fractions measured at the first radial locations.

5. The disk drive as recited in claim 1, wherein the control circuitry is further configured to estimate the second plurality of radial locations by curve fitting the fractions measured at the first radial locations.

6. A method of operating a disk drive, the method comprising:
    synchronizing a disk-locked clock to a rotation of a disk, wherein:
        the disk-locked clock comprises a plurality of clock cycles; and
        a reader/writer gap of a head spans a first number of the clock cycles comprising an integer of the clock cycles plus a fraction of one of the clock cycles;
    measuring the fraction of one of the clock cycles when the head is positioned at a first plurality of radial locations across the disk; and
    estimating a second plurality of radial locations where the fraction substantially equals a full one of the clock cycles.

7. The method as recited in claim 6, further comprising estimating the first number of the clock cycles for a third plurality of radial locations based on the second plurality of radial locations.

8. The method as recited in claim 7, further comprising:
    measuring a first integer M of clock cycles at a first radial location; and
    estimating a first number of clock cycles at a second radial location by adding N to the first integer M where N represents a number of times the fraction substantially equals a full one of the clock cycles between the first radial location and the second radial location.

9. The method as recited in claim 8, further comprising estimating the fraction of one of the clock cycles at the second radial location based on the fractions measured at the first radial locations.

10. The method as recited in claim 6, further comprising estimating the second plurality of radial locations by curve fitting the fractions measured at the first radial locations.

* * * * *